United States Patent [19]
Clavel

[11] Patent Number: 6,056,080
[45] Date of Patent: May 2, 2000

[54] ENGINE MOUNTS FOR RACING KARTS

[76] Inventor: Ricardo F. Clavel, 3007 138th St. SE., Bothell, Wash. 98102

[21] Appl. No.: 08/825,506

[22] Filed: Mar. 31, 1997

[51] Int. Cl.[7] ..................................................... B60K 5/12
[52] U.S. Cl. ........................... 180/291; 248/674; 280/798
[58] Field of Search ................................... 248/674, 678, 248/230.5, 231.61; 180/220, 221, 60, 291, 297; 280/798

[56] References Cited

U.S. PATENT DOCUMENTS

| | | | |
|---|---|---|---|
| 2,574,824 | 11/1951 | Garelli | 180/221 |
| 3,431,994 | 3/1969 | Wood, Jr. | 180/221 X |
| 3,623,747 | 11/1971 | Humlong | 248/230.5 X |
| 4,121,681 | 10/1978 | Jensen | 180/291 |
| 4,535,866 | 8/1985 | Shiga | 180/291 X |
| 5,474,270 | 12/1995 | Rixen et al. | 248/230.5 |

*Primary Examiner*—Michael Mar
*Attorney, Agent, or Firm*—Jensen & Puntigam

[57] ABSTRACT

The engine mount system for racing karts includes two separate spaced mounts, each of which is secured on two spaced support rails of the kart's chassis frame. Each of the mounts includes arcuate portions in a lower surface thereof which are configured to fit around a portion of the spaced rails. Retainer portions connect to a bottom surface of each mount and secure the mounts to the rails. One mount includes two upright connecting members which extend upwardly from an upper surface of a base portion of the mount, the connecting members being offset somewhat from the centerline of the mount. The other mount includes a U-shaped connecting member which extends from an upper surface of the base portion of the mount, the U-shaped member also being offset from the centerline of the base portion. The U-shaped member and the spaced connecting members both include openings therethrough which permit connection of those members to the engine.

7 Claims, 3 Drawing Sheets

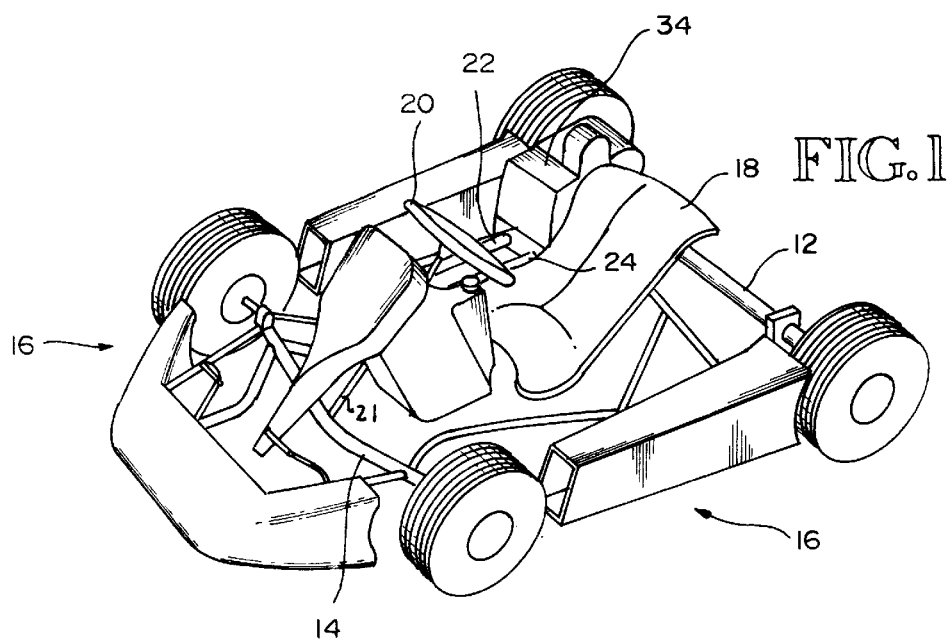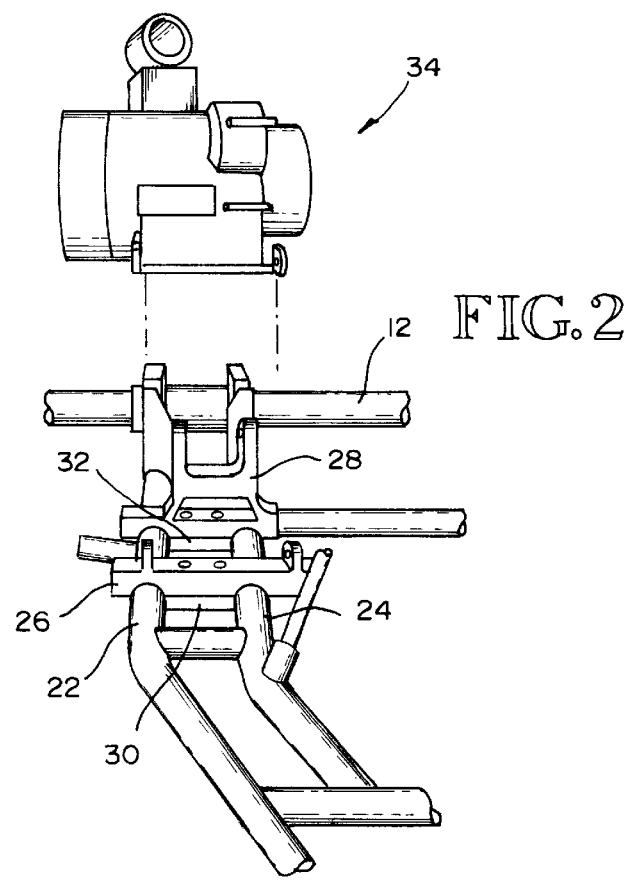

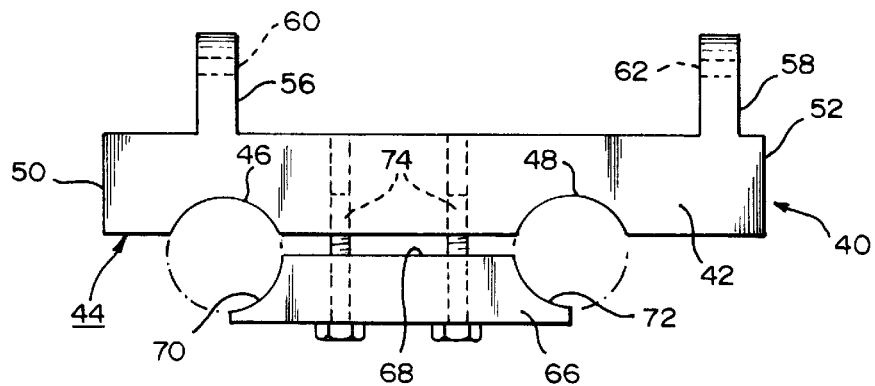
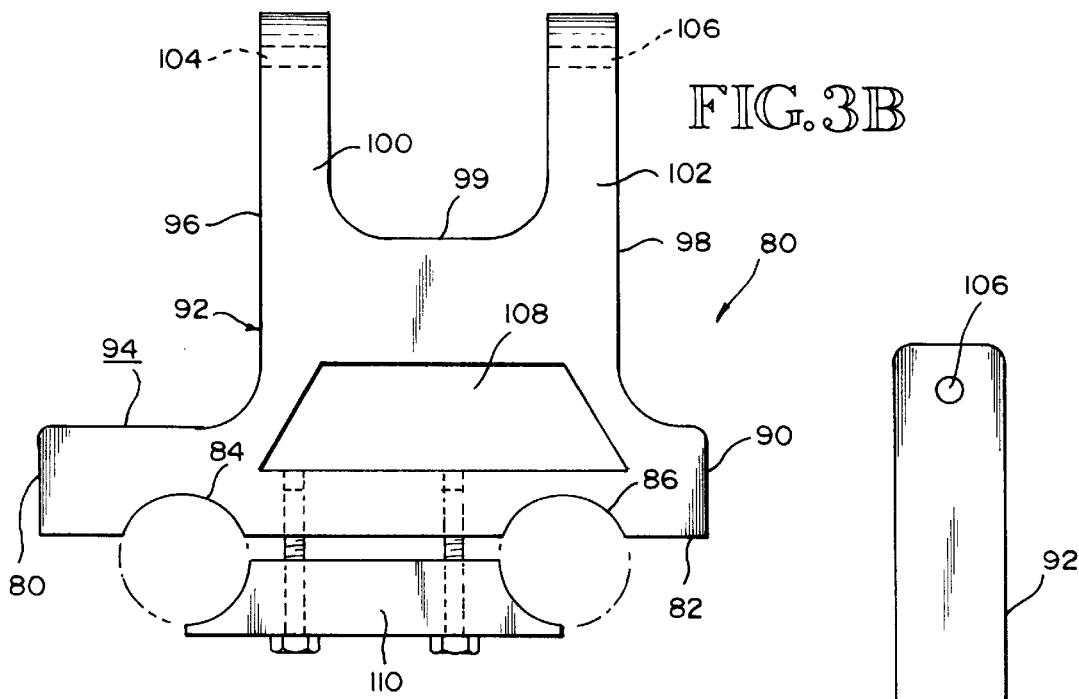
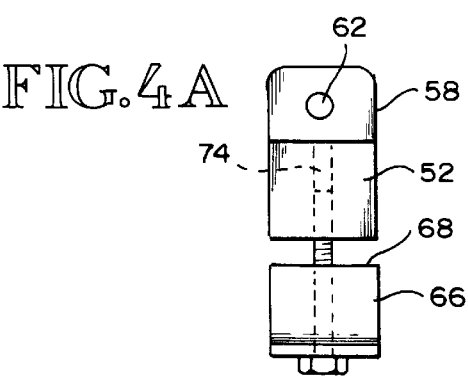
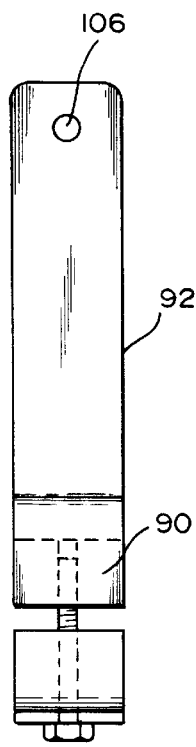

ENGINE MOUNTS FOR RACING KARTS

TECHNICAL FIELD

This invention relates generally to racing karts, and more specifically concerns engine mounts used in such karts.

BACKGROUND OF THE INVENTION

Go-karts (known commonly as karts) are generally well-known in the United States. Further, interest in kart racing, in which the karts reach speeds of up to 100 miles per hour around a track, has been increasing in popularity. Generally, karts are rather simple, small, very inexpensive motor vehicles for a single person (the driver), powered by a small two-cycle engine. Karts typically are not street vehicles; they are used generally on special tracks or on other off-road facilities. Racing karts, however, have become quite sophisticated. As an example, the handling characteristics of a racing kart, particularly at high speeds, are quite acute and require a considerable amount of skill and experience. Therefore, anything which interferes with the proper handling of a racing kart is detrimental to its racing performance.

The frame portion of a kart chassis structure is typically conventional in design. It includes two spaced rails on the righthand side of the kart, somewhat greater than 3½ inches apart. The frame is made from steel tubing which flexes somewhat under stress. Positioned between and secured to the two spaced rails in previous kart designs is a single engine mount to which, in turn, is attached the kart engine, typically by bolts or the like. In a typical kart, including racing karts, the engine is positioned to the side and slightly to the rear of the driver's seat. The engine mount is affixed to the spaced rails and has upright connecting members near the front and the rear of the mount. The upright connections are configured to permit connection of the engine thereto at the front and rear thereof, respectively.

There are significant disadvantages to the above-described engine mount. That engine mount will typically not permit the two rails to flex relative to each other in the vicinity of the mount. In normal kart operation, as indicated above, the chassis flexes somewhat as the kart moves at high speeds around the track. The existing engine mounts prevent that flexing around the point where it is positioned. This results in a "binding" of the chassis during certain aspects of its normal operation, particularly in tight turns, which is, of course undesirable, as it makes handling of the kart more difficult.

In addition, the known engine mount requires an offset configuration in which the engine is positioned not directly over the spaced rails, but offset relative to the spaced rails. This offset is necessary for proper alignment of the chain drive from the engine to the drive wheel sprocket. This offset arrangement of existing single-engine mounts, however, has resulted in a significant breakage problem, particularly around the welds of the mounts.

DISCLOSURE OF THE INVENTION

Accordingly, the invention is an engine mount system adapted specifically for racing karts, comprising: a first engine mount which is adapted to be secured on two spaced rails which form part of a chassis portion of a racing kart, wherein the first engine mount is configured and adapted to be connected to and support a front end portion of a racing kart engine; and a second engine mount adapted to be secured on said two spaced rails, the second engine mount being spaced a distance apart from the first mount, the two mounts being otherwise independent of each other, and wherein the second engine mount is configured and adapted to be connected to and support a rear end portion of the racing kart engine.

BRIEF DESCRIPTION OF THE DRAWINGS

FIG. 1 is an environmental view of a racing kart, showing spaced chassis rails for supporting the engine.

FIG. 2 is an exploded perspective of a portion of the two spaced rails of FIG. 1, as well as the engine mounts of the present invention positioned thereon.

FIGS. 3a and 3b are front elevational views of one embodiment of the front and rear engine mounts of one embodiment of the present invention.

FIGS. 4a and 4b are side views of the mounts of FIGS. 3a and 3b.

BEST MODE FOR CARRYING OUT THE INVENTION

Figure 5A:
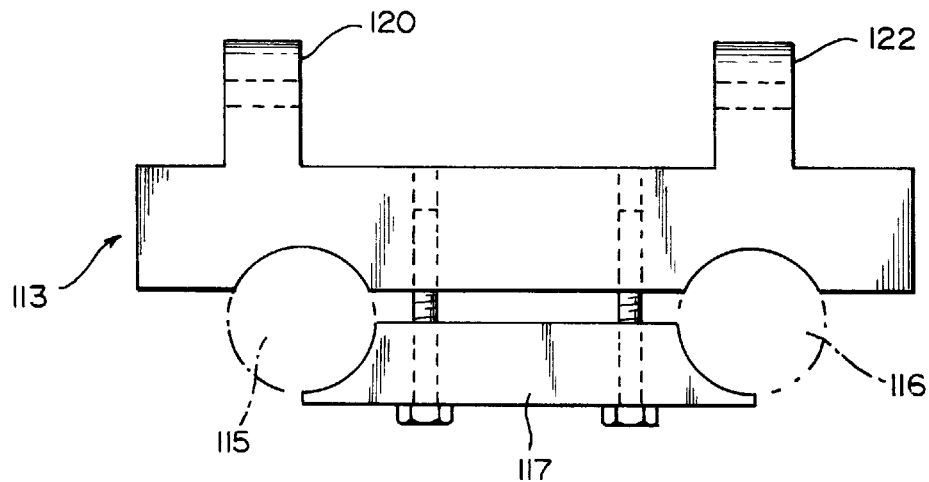
FIGS. 5a and 5b are front elevational views of a second embodiment of the engine mounts of the present invention.
Figure 5B:
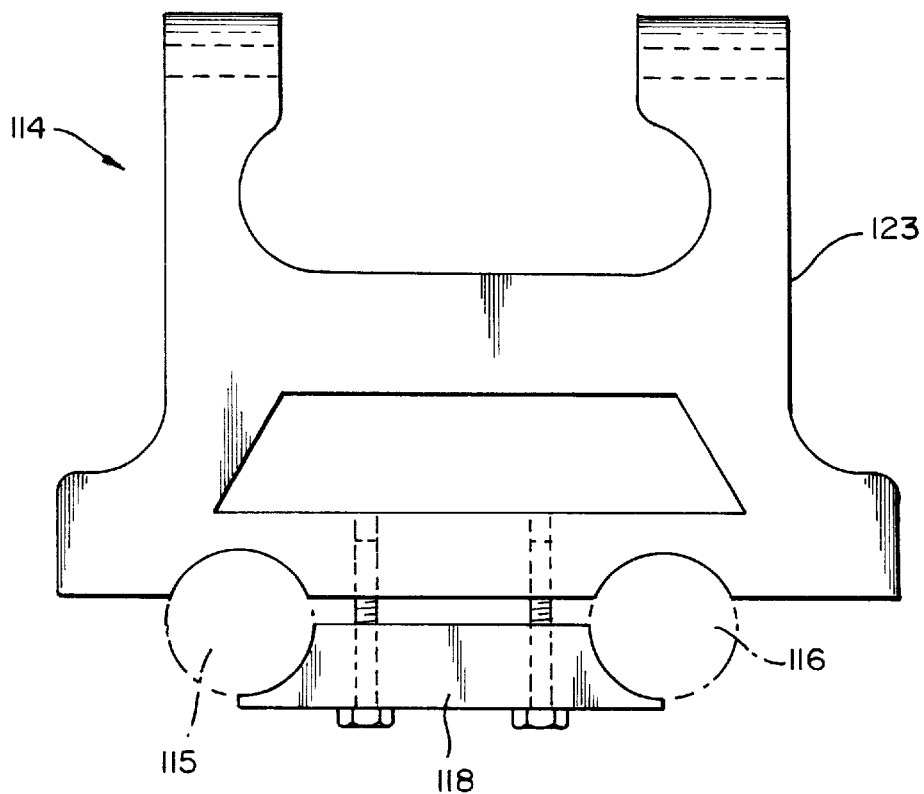

FIG. 1 shows a typical racing kart on which the engine mounts of the present invention can be used. The racing kart shown is intended to be a representative example. The kart of FIG. 1 is typically used on a racing track. The chassis frame includes a rear axle 12 and a front axle 14, on which are mounted racing wheels which are typically made from aluminum. The chassis body 16 typically is made of fiberglass or plastic, although other materials could be used. The chassis body 16 can cover most of the frame, like a conventional automobile, or the "body" could be in the form of a set of panels, located at the front, back and sides of the kart and connected to the frame. The kart will also include a driver's compartment with a seat 18 and a steering wheel 20 which connects to the front wheels through a conventional post and arm arrangement 21.

It should be emphasized that while the chassis frame can be generally similar from kart to kart, there can also be substantial differences. The body of the chassis will also vary considerably in appearance and configuration. The body can in some cases, as indicated above, be a complete shell or a more open, partial body style, such as shown in FIG. 1. However, the particular body style and even the particular chassis frame is not particularly relevant to the present invention and can be varied.

Along the right side of the racing kart, forming part of the chassis frame, are two spaced rails 22 and 24. Rails 22 and 24 typically are made of steel tubing like most of the remainder of the chassis frame. Typically, the two rails are spaced apart a specific distance, i.e. 3.54 inches in the embodiment shown. The rail spacing may of course vary.

The two spaced rails 22 and 24 are an important part of a racing kart (as well as many other karts), since it is upon these rails that the engine is supported, by means of engine mounts which are directly connected thereto. FIG. 2 shows more specifically the engine mount arrangement of the present invention, involving the two rails 22 and 24 and two engine mounts 26 and 28, which are individually connected to the spaced rails, respectively, and are held there firmly by means of retainers 30 and 32. The two engine mounts 26 and 28 are completely independent of each other and are not in any way connected to each other, other than through the rails themselves on which they are mounted. Mounts 26 and 28, referred to as front and rear mounts, are arranged and configured to connect to and support engine 34. Typically, front mount 26 will connect to a front end of an engine 34, while rear mount 28 will connect to a rear end of the engine.

In racing karts, various two-cycle engines are utilized, typically single-cylinder, among the more popular being Yamaha and Kawasaki engines. The engines will vary in displacement and horsepower, although typical engines might be 80–125 cc. Each engine has its own particular configuration and the engine mounts are adapted to fit each engine. Hence, certain portions of the engine mounts of the present invention will vary somewhat in configuration, depending upon the particular engine being used in the kart. However, all of the engine mounts of the present invention share certain characteristics which are explained below. Two embodiments of the engine mounts of the present invention are disclosed in some detail herein. It should be understood, however, that additional embodiments are possible, depending upon the particular engine being utilized.

FIGS. 3a and 3b show front elevational views of one embodiment of the racing kart engine mounts of the present invention. FIGS. 4a and 4b show side views of those mounts. The front mount 40 (FIG. 3a) is approximately 6.75 inches in length and one inch thick. Mount 40 has a base section 42 which is approximately one inch high. In lower surface 44 of the base section are two arcuate portions 46 and 48. Each arcuate portion is approximately 1.14 inches long and covers an arc of approximately 120–130°. Arcuate section 46 is centered 1.23 inches from one end 50 of the base section, while the other arcuate portion 48 is centered at 1.98 inches from the other end 52 of the base section. Each arcuate section is configured to mate, respectively, with the surface of the spaced chassis rails.

Extending upwardly from an upper surface 54 of base section 42 are first and second connecting members 56 and 58. Each of the connecting members is approximately 0.40 inches wide and approximately one inch tall. Connecting member 56 is centered above arcuate section 46 and its centerline is approximately 1.18 inches from the one end 50 of the base section, while the centerline of connector 58 is located approximately 0.42 inches from the other end 52 of the base section. Each of the connecting members 56 has openings 60 and 62, respectively, therethrough, which permits them to be bolted to the front end of the engine. The engine mount 40 typically is a single piece of high grade steel, cut and machined to the required close tolerances.

Bolted into the lower surface 44 of the base portion is a retainer element 66. The upper surface 68 thereof abuts the lower surface 44 of the base section 42. The ends of retainer 66 are formed into arcuate portions 70 and 72, which are configured to mate against the surface of the spaced chassis rails. The portions 70 and 72 have an arc of approximately 45°. After mount 40 has been positioned on the rails, the retainer 66 is bolted thereto by means of bolts 74—74, which firmly positions the mount against the spaced rails.

FIG. 3b shows a rear mount 80 which is the companion mount to front mount 40 for the first embodiment. Rear mount 80 is 6.25 inches long at its lower surface 82. In the lower surface 82 are two arcuate portions 84 and 86, both with arcs of approximately 120–130°. They are configured to fit on the spaced rails, similar to the arcuate portions of front mount 40. The centerline of arcuate section 84 is located 1.35 inches from one end 88 of mount 80, while the centerline of arcuate section 86 is also located 1.35 inches from the other end 90 of the mount.

From lower surface 82, the end surfaces of the mount extend upwardly for approximately one inch before converging horizontally inwardly parallel with lower surface 82. This surface is shown as 94. A connecting member 92, generally U-shaped, extends upwardly from surface 94. The corners where connecting member 92 extends upwardly from surface 94 are curved. One side 96 of U-shaped connecting member 92 is located 2.09 inches from the one end 88 of the mount, while the other side 98 is located 0.80 inches from the other end 90. The U-shaped connecting member 92 is approximately 3.79 inches high and 3.36 inches wide.

Connecting member 92 includes two upright arm portions 100 and 102. Each of the arm portions in the embodiment shown is 2.13 inches high and 0.63 inches wide, leaving a space between the two arm portions of 2.110 inches. The inner edge surfaces of the arm portions are rounded at their lower ends into horizontal surface 99 connecting the two arm portions. Also located in each of the arm portions are openings 104 and 106, to permit connection of the connecting member 92 to the rear of the engine. A trapezoidal-shaped opening 108 is also present in the mount in order to reduce weight without reducing strength. Rear mount 80 also includes a retainer element 110, which is bolted to the lower surface 82 of the mount 80 to retain the mount against the two spaced rails, like the retainer for the front mount 40.

As with front mount 40, rear mount 80 and retainer 110 are made from a single piece of high quality steel, cut and machined to the required precise dimensions.

The embodiment of FIGS. 5a/5b is similar in general concept to the embodiment shown in FIGS. 3a/3b and 4a/4b. The mounts 113, 114 are secured to the spaced rails 115, 116 by means of retainers 117, 118, like the first embodiment. The mounts include arcuate sections in the lower surfaces thereof for mating with the spaced rails. The retainers have arcuate portions at their ends to fit around the spaced rails. The front mount includes two upright connecting members 120 and 122 and the rear mount includes a U-shaped connector member 123. However, the configuration of the mounts is slightly different than for the first embodiment. The overall dimensions are somewhat different and they are more symmetrical, with the front mount 113 being symmetrical about its centerline, while rear mount 114 is only slightly offset to one side. FIGS. 5A/5B simply illustrate how differences in engine configuration will result in slight differences in mount configuration. However, the basic concepts behind the two embodiments remain the same.

In each embodiment, there are two mounts (front and rear) which are physically separate from each other. This permits the chassis frame to flex without binding during racing operation. Further, in each embodiment, the connecting members are offset somewhat to accommodate the position of the drive chain. The offset, however, is accomplished by the position of the connecting members. The base portion of the mount is usually positioned evenly, i.e. symmetrically, on the rails. This arrangement has the advantage of a correct offset, without compromising the overall strength of the mount, thereby minimizing the possibility of cracking or breakage of the mount.

Hence, an engine mount system adapted particularly for use with racing karts has been disclosed. The system solves a number of problems with existing mounts without increasing expense.

Although a preferred embodiment of the invention has been disclosed herein for illustration, it should be understood that various changes, modifications and substitutions may be incorporated in such embodiment without departing from the spirit of the invention, which is defined by the claims which follow:

What is claimed is:

1. An engine mount system for racing go-karts, useful with a go-kart engine having portions to which engine mounts can be connected, the engine mount system comprising:

a first engine mount adapted to be secured on two spaced rails and to be removable therefrom, the spaced rails forming part of a chassis portion of a racing go-kart, wherein the first engine mount is configured and adapted to be connected to and support a first portion of a racing go-kart engine, wherein the first engine mount includes a first base portion which extends between the two spaced rails and two upright, substantially vertical, spaced connecting arms which extend upwardly from the first base portion, said connecting arms including means for connecting said first engine mount to separate, spaced, first and second locations on said first portion of the racing go-kart engine, the first base portion having mating portions which mate with the two spaced rails; and a second engine mount adapted to be secured on said two spaced rails and to be removable therefrom, wherein the second engine mount is configured and adapted to be connected and support a second portion of a racing go-kart engine, spaced away from the first portion thereof, wherein the second engine mount includes a second base portion which extends between the spaced rails and wherein the second engine mount includes a U-shaped connecting member which extends upwardly from the second base portion, the U-shaped member including two substantially vertical arm portions having openings therethrough which permit connection of the said two arm portions to separate, spaced first and second locations on said second portion of the racing go-kart engine, the second base portion having mating portions which mate with the spaced rails.

2. A system of claim 1, the first base portion having two arcuate portions which are each configured to mate with a surface portion of the two spaced rails, respectively, the first engine mount further including a first retainer portion which is adapted to be fixedly connected to a lower surface of the first base portion, the first retainer portion including arcuate portions at both ends thereof, configured to mate with another surface portion of the two spaced rails, so that when the first retainer portion is in place, the first engine mount is secured on the two spaced rails.

3. A system of claim 1, the second base portion having two arcuate portions thereon which are each configured to mate with a surface portion of the two spaced rails, respectively, the second engine mount further including a second retainer portion which is adapted to be fixedly connected to a lower surface of the second base portion, the second retainer portion including arcuate portions at both ends thereof, configured to mate with another surface portion of the two spaced rails, so that when the second retainer portion is in place, the second engine mount is secured on the two spaced rails.

4. An engine mount system for racing go-karts, useful with a go-kart engine having portions to which engine mounts can be connected, the engine mount system comprising:

a first engine mount adapted to be secured on two spaced rails which form part of a chassis portion of a racing go-kart, wherein the first engine mount is configured and adapted to be connected to and support a first portion of a racing go-kart engine, the first engine mount including a first base portion and a first connecting portion which extends upwardly therefrom, the first connecting portion including means for connecting the first engine mount to the go-kart engine at two spaced locations, wherein the first base portion includes mating portions thereof which mate with the spaced rails, and wherein the mating portions of the first base portion are offset laterally relative to the first connecting portion such that when the first engine mount is reversed on the spaced rails, the position of the mounted engine changes laterally relative to the spaced rails; and a second engine mount adapted to be secured on said two spaced rails, wherein the second engine mount is configured and adapted to be connected to and support a second portion of the racing go-kart engine, the second engine mount including a second base portion and a second connecting portion which extends upwardly therefrom, the second connecting portion including means for connecting the go-kart engine to the second engine mount at two spaced locations, wherein the second base portion includes mating portions thereof which mate with the spaced rails, and wherein the mating portions of the second base portion are offset laterally relative to the second connecting portion such that when the second engine mount is reversed on the spaced rails, the position of the mounted engine changes laterally relative to the spaced rails.

5. A system of claim 4, wherein the first connecting portion includes two upright spaced connecting members extending upwardly from the first base portion, the spaced connecting members including means for connecting said connecting members to the racing go-kart engine, wherein the first base portion and the connecting members are unitary, made from a single piece of material.

6. A system of claim 5, wherein the second connecting portion includes a U-shaped connecting member which extends upwardly from the second base portion, the U-shaped member including two arm portions having openings therethrough which permit connection of the U-shaped connecting member to the racing go-kart engine, wherein the second base portion and the second connecting portion are unitary, made from a single piece of material.

7. A system of claim 4, wherein the mating portions of the first and second base portions include arcuate-shaped portions configured to mate with the spaced rails.

* * * * *